United States Patent
Liu et al.

(10) Patent No.: US 11,803,475 B2
(45) Date of Patent: Oct. 31, 2023

(54) METHOD AND APPARATUS FOR DATA CACHING

(71) Applicant: Inspur Electronic Information Industry Co., Ltd., Shandong (CN)

(72) Inventors: Haiwei Liu, Shandong (CN); Gang Dong, Shandong (CN); Hongbin Yang, Shandong (CN); Yaqian Zhao, Shandong (CN); Rengang Li, Shandong (CN); Hongzhi Shi, Shandong (CN)

(73) Assignee: INSPUR ELECTRONIC INFORMATION INDUSTRY CO., LTD., Jinan (CN)

( * ) Notice: Subject to any disclaimer, the term of this patent is extended or adjusted under 35 U.S.C. 154(b) by 37 days.

(21) Appl. No.: 17/640,276

(22) PCT Filed: Nov. 28, 2019

(86) PCT No.: PCT/CN2019/121571
§ 371 (c)(1),
(2) Date: Mar. 3, 2022

(87) PCT Pub. No.: WO2021/042594
PCT Pub. Date: Mar. 11, 2021

(65) Prior Publication Data
US 2022/0342824 A1    Oct. 27, 2022

(30) Foreign Application Priority Data
Sep. 3, 2019 (CN) .......................... 201910827022.8

(51) Int. Cl.
*G06F 12/08* (2016.01)
*G06F 12/0855* (2016.01)
*G06F 12/0897* (2016.01)

(52) U.S. Cl.
CPC ...... *G06F 12/0855* (2013.01); *G06F 12/0897* (2013.01); *G06F 2212/1024* (2013.01)

(58) Field of Classification Search
CPC ............. G06F 12/0855; G06F 12/0897; G06F 2212/1024
See application file for complete search history.

(56) References Cited

U.S. PATENT DOCUMENTS 6,542,987 B1 *  4/2003  Fischer ................... G06F 9/384
                                                714/21
9,910,598 B2    3/2018  Li et al.
(Continued)

FOREIGN PATENT DOCUMENTS

| CN | 101515295 A | 8/2009 |
| CN | 104199790 A | 10/2014 |

(Continued)

OTHER PUBLICATIONS

Supplementary European Search Report in reference to European Application No. 19944564.
(Continued)

*Primary Examiner* — Jae U Yu
(74) *Attorney, Agent, or Firm* — DINSMORE & SHOHL LLP

(57) ABSTRACT

The present invention provides a method and apparatus for data caching. The method comprises: output matrixes are acquired one by one, a plurality of acquired output matrixes are written alternately into two queue sets of a first cache unit according to a sequence in which the output matrixes are acquired, and the output matrixes stored line by line in a first cache unit are written into a second cache unit one by one, according to the sequence in which the output matrixes are written into the second cache unit, valid data of each output matrix of the second cache unit is determined one by one according to preset parameters, and the valid data of
(Continued)

each output matrix is written into a third cache unit, and the valid data of the output matrixes stored in the third cache unit are configured to be sequentially written into a memory according to a sequence in which the valid data are written into the third cache unit. In the present solution, the output matrixes are cached by using cache units with the writing speed matching with the computing speed of a processor, and the output matrixes are completely written into a memory one by one according to a sequence of generation time. Therefore, the present invention may solve the problem that the computing speed of the processor does not match with the writing speed of the memory.

6 Claims, 3 Drawing Sheets

(56) References Cited

U.S. PATENT DOCUMENTS

| | | | |
|---|---|---|---|
| 10,318,173 | B2 | 6/2019 | Ooi et al. |
| 2010/0318173 | A1 | 12/2010 | Kolandaivelu et al. |
| 2018/0157967 | A1 | 6/2018 | Henry et al. |
| 2020/0057938 | A1 | 2/2020 | Lu et al. |

FOREIGN PATENT DOCUMENTS

| | | | |
|---|---|---|---|
| CN | 104545902 | A | 4/2015 |
| CN | 105468305 | A | 4/2016 |
| CN | 106844740 | A | 6/2017 |
| CN | 106909554 | A | 6/2017 |
| CN | 108229645 | A | 6/2018 |
| CN | 109032781 | A | 12/2018 |
| CN | 109446996 | A | 3/2019 |
| CN | 109934336 | A | 6/2019 |
| CN | 109934339 | A | 6/2019 |
| WO | 2019109795 | A1 | 6/2019 |
| WO | 2021042594 | A1 | 3/2021 |

OTHER PUBLICATIONS

Chinese Office Action dated Apr. 24, 20204 in reference to Application No. 201910827022.8.
Chinese Office Action dated Apr. 24, 2021 in reference to Application No. 201910827022.8.
"Research on Hardware Implementation and Optimization Technology of Deep Learning", Feb. 2, 2015.
International Search Report dated Apr. 24, 2020, in reference to Chinese Application No. PCT/CN2019/121571 filed Nov. 28, 2019.
Written Opinion dated Apr. 24, 2020, in reference to Chinese Application No. PCT/CN2019/121571 filed Nov. 28, 2019.

* cited by examiner

METHOD AND APPARATUS FOR DATA CACHING

The present application claims the priority of the Chinese patent application filed with the Chinese Patent Office on Sep. 3, 2019 with the application number of 201910827022.8 and entitled "Method and Apparatus for data caching", the contents of which are incorporated herein in its entirety by reference.

TECHNICAL FIELD

The present invention relates to the technical field of computers, in particular to a method and apparatus for data caching.

BACKGROUND ART

At present, various forms of computers have been widely used in all the fields of social life. During the operating process of computers, a large number of data operations are often involved. In particular, when computers are used for computation related to convolutional neural networks, a processor needs to read input matrixes from a memory one by one, then performs convolution computation on the input matrixes, and then stores the computed output matrixes in the memory one by one for the next computation. Wherein, the computing speed of the processor is generally faster than the writing speed of the memory (that is, the speed of writing data into a memory). If the output matrixes of the processor are directly written into the memory, the processor has already generated the next output matrix before the previous output matrix is completely written, thereby leading to data loss of the previous output matrix. Therefore, a method for data caching is in urgent need to solve the problem that the computing speed of the processor does not match with the writing speed of the memory.

SUMMARY OF THE INVENTION

Based on the above problems in the prior art, the present invention provides a method for data caching, to solve the problem that the computing speed of the processor does not match with the writing speed of the memory.

A first aspect of the present invention provides a method for data caching, including:
acquiring an output matrix from a processor, wherein the output matrix is an N-order matrix, and N is a positive integer;
respectively writing N rows of data of the output matrix into N first-level cache queues of a target queue set of a first cache unit; wherein the first cache unit is preconfigured with two queue sets, the target queue set is the queue set that is not used to store a previous output matrix of the output matrix in the two queue sets; and the writing speed of the first cache unit matches with the computing speed of the processor;
after the previous output matrix of the output matrix stored in the first cache unit is written into a second cache unit, writing the data of the output matrix stored in the target queue set into the second cache unit line by line, so as to write the output matrix into the second cache unit; wherein the writing speed of the second cache unit matches with the computing speed of the processor; and
after valid data of the previous output matrix of the output matrix stored in the second cache unit is written into a third cache unit, determining valid data in the output matrix according to preset parameters, and writing the valid data of the output matrix into the third cache unit; wherein the valid data of a plurality of output matrixes in the third cache unit is configured to be sequentially written into a memory in a sequence in which the output matrixes are acquired, and wherein the writing speed of the third cache unit matches with the computing speed of the processor.

Optionally, the output matrix is an output matrix obtained by convolution computation using a two-dimensional systolic array during the computing process of a convolutional neural network;
before respectively writing N rows of data of the output matrix into N first-level cache queues of a target queue set of a first cache unit, the method further includes:
rearranging the data matrix according to a preset data storage sequence, to obtain an output matrix after rearranging;
the respectively writing N rows of data of the output matrix into N first-level cache queues of a target queue set of a first cache unit includes:
respectively writing N rows of data of an output matrix after rearranging into N first-level cache queues of a target queue set of a first cache unit.

Optionally, the method further includes the following step before respectively writing N rows of data of the output matrix into N first-level cache queues of a target queue set of a first cache unit:
deleting redundant data of the output matrix, to obtain a filtered output matrix;
the respectively writing N rows of data of the output matrix into N first-level cache queues of a target queue set of a first cache unit includes:
writing the filtered output matrix into a target queue set of a first cache unit, wherein M rows of data of the filtered output matrix are respectively stored in M cache queues of the target queue set, wherein M is a positive integer less than or equal to N.

Optionally, the output matrix is an output matrix obtained by convolution computation using a two-dimensional systolic array during the computing process of the convolutional neural network;
determining the valid data in the output matrix according to preset parameters includes:
determining valid data in the output matrix according to a preset step size in the neural network.

Optionally, the process of performing convolution computation by using a two-dimensional systolic array to obtain an output matrix includes:
splitting input data of a convolutional layer into a plurality of input matrixes; and
performing convolution computation on the input matrix using a two-dimensional systolic array aiming at each input matrix, to obtain an output matrix corresponding to the input matrix.

A second aspect of the present invention provides an apparatus for data caching, including:
an acquisition unit, configured to acquire an output matrix from a processor, wherein the output matrix is an N-order matrix, and N is a positive integer;
a first writing unit, configured to respectively write N rows of data of the output matrix into N first-level cache queues of a target queue set of a first cache unit; wherein the first cache unit is preconfigured with two queue sets, the target queue set is the queue set that is not used to store a previous output matrix of the output matrix in the two queue sets; and the writing speed of the first cache unit matches with the computing speed of the processor;

a first cache unit, configured to cache data written by the first writing unit;

a second writing unit, configured to write the data of the output matrix stored in the target queue set into the second cache unit line by line after the previous output matrix of the output matrix stored in the first cache unit is written into a second cache unit, so as to write the output matrix into the second cache unit; wherein the writing speed of the second cache unit matches with the computing speed of the processor;

a second cache unit, configured to cache data written by the second writing unit;

a third writing unit, configured to determine valid data in the output matrix according to preset parameters after the valid data of the previous output matrix of the output matrix stored in the second cache unit is written into a third cache unit, and write the valid data of the output matrix into the third cache unit; wherein the valid data of a plurality of output matrixes in the third cache unit is configured to be sequentially written into a memory in which the output matrixes are acquired, and wherein, the writing speed of the third cache unit matches with the computing speed of the processor; and a third cache unit, configured to cache data written by the third writing unit.

Optionally, the output matrix is an output matrix obtained by convolution computation using a two-dimensional systolic array during the computing process of the convolutional neural network;

the first writing unit is specifically configured to:

rearrange the data matrix according to a preset data storage sequence, to obtain an output matrix after rearranging;

respectively write N rows of data of an output matrix after rearranging into N first-level cache queues of a target queue set of a first cache unit.

Optionally, the first writing unit is specifically configured to:

delete redundant data of the output matrix, to obtain a filtered output matrix; and write the filtered output matrix into a target queue set of a first cache unit, wherein M rows of data of the filtered output matrix are respectively stored in M cache queues of the target queue set, wherein M is a positive integer less than or equal to N.

Optionally, the output matrix is an output matrix obtained by convolution computation using a two-dimensional systolic array during the computing process of the convolutional neural network;

the third writing unit is specifically configured to:

determine valid data in the output matrix according to a preset step size in the convolutional neural network.

The present invention provides a method and apparatus for data caching. The method includes: acquiring output matrixes one by one, writing alternately a plurality of acquired output matrixes into two queue sets of a first cache unit according to a sequence in which each output matrix is acquired, writing output matrixes stored line by line in a first cache unit into a second cache unit one by one, determining valid data of each output matrix of the second cache unit one by one according to preset parameters in a sequence in which the valid data are written into the second cache unit, and writing valid data of each output matrix into a third cache unit, wherein the valid data of the output matrix stored in the third cache unit are configured to be sequentially written into a memory according to a sequence in which the valid data are written into the third cache unit. In the present solution, output matrixes are cached utilizing a cache unit with the writing speed matching with the computing speed of a processor, and the output matrixes are completely written into a memory one by one according to a sequence of generation time. Therefore, the present invention may solve the problem that the computing speed of the processor does not match with the writing speed of the memory.

BRIEF DESCRIPTION OF THE DRAWINGS

In order to more clearly illustrate technical solutions in embodiments of the present application or in the prior art, a brief introduction will be given below on accompanying drawings which need to be used in the description of the embodiments or the prior art. Apparently, the accompanying drawings described below are merely some embodiments of the present application. Those skilled in the art can obtain other accompanying drawings according to these drawings without any creative effort.

DETAILED DESCRIPTION OF THE EMBODIMENTS

A clear and complete description will be given below on technical solutions in embodiments of the present invention in combination with accompanying drawings in the embodiments of the present invention. Apparently, the described embodiments are merely part, but not all, of the embodiments of the present invention. All the other embodiments obtained by those skilled in the art without any creative effort based on the embodiments in the present invention shall all fall within the protection scope of the present invention.

Figure 1:
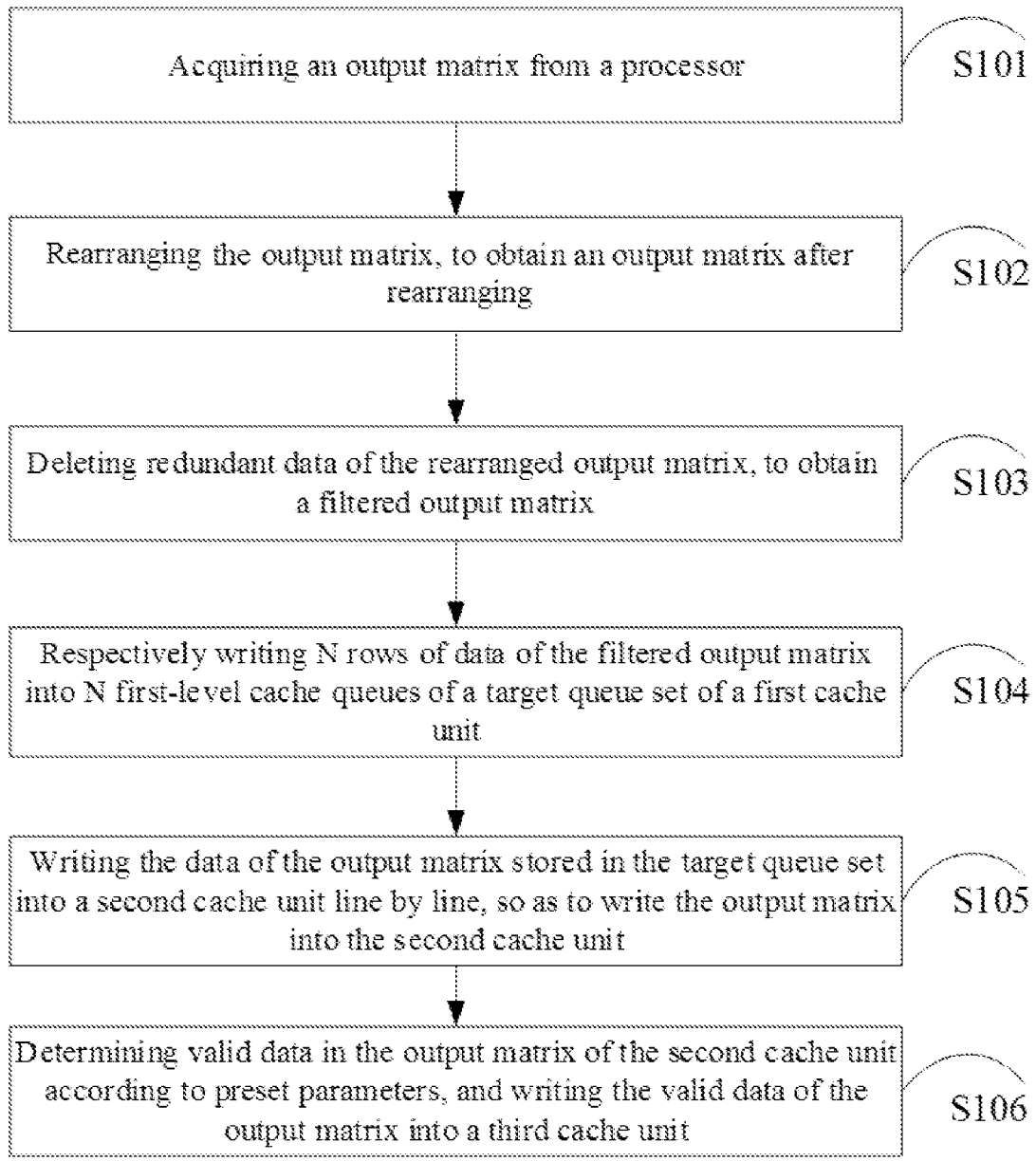
FIG. 1 is a flow chart of a method for data caching provided in an embodiment of the present invention.

An embodiment of the present invention provides a method for data caching, please refer to FIG. 1, the method includes the following steps:

Firstly, it should be noted that the method for data caching provided in an embodiment of the present invention may be applied to a computing process of any arbitrary convolutional layer of a convolutional neural network, and may also be applied to other situations in which data in the form of matrixes need to be computed by using a computer.

To facilitate understanding, the process of implementing the method provided in the present embodiment is introduced below with the computing process of a convolutional neural network as an example. Moreover, in the present embodiment, the computation of the convolutional neural network is implemented using a two-dimensional systolic array.

S101, acquiring an output matrix from a processor.

Wherein the output matrix is an N-order matrix, and N is a positive integer.

The processor mentioned in step S101 refers to a two-dimensional systolic array for performing convolution computation. The two-dimensional systolic array is a commonly used processor architecture. The two-dimensional systolic array consists of a plurality of processing units that can perform operations in parallel, therefore, the two-dimensional systolic array can perform operations on a large number of data in parallel and is widely used in applications such as convolutional neural networks where a large number of data need to be computed.

A convolutional neural network consists of several convolutional layers connected in series, and each convolutional layer corresponds to a convolutional kernel, the size of the convolutional kernel may be different for different convolutional layers. For example, the size of the convolutional kernel corresponding to a convolutional layer 1 is 3×3, and the size of the convolutional kernel corresponding to a convolutional layer 2 is 1×1. In a convolutional neural network, each convolutional layer is configured to perform convolution computation on the input of the convolutional layer with its own convolutional kernel as an operation parameter, to obtain the output of the convolutional layer.

Wherein, the input of the first convolutional layer of the convolutional neural network is the input of the convolutional neural network, and the output of the last convolutional layer of the convolutional neural network is the output of the convolutional neural network. Except for the first and the last convolutional layers, the output of each convolutional layer in the convolutional neural network is used as the input of the next convolutional layer. Moreover, the input and output of each convolutional layer in the convolutional neural network are matrixes.

In the present embodiment, the two-dimensional systolic array is taken as a computing tool to perform convolution operation on each convolutional layer in the convolutional neural network. However, when the two-dimensional systolic array is applied in a convolutional neural network, the output of the two-dimensional systolic array is generally not directly written into a memory as the output of a convolutional layer, but requires some post-processing of the output of the two-dimensional systolic array before the output of a convolutional layer may be obtained. The method for data caching introduced with a two-dimensional systolic array as an example in the present embodiment further includes some post-processing steps.

Those skilled in the art may understand that in the method for data caching provided in other embodiments of the present application, if the data to be cached is not the data output from the convolution operation performed by the two-dimensional systolic array, the post-processing step mentioned previously may also be not performed.

Generally, the process of implementing convolution operation of a certain convolutional layer in a convolutional neural network using a two-dimensional systolic array includes:

dividing the input of a convolutional layer into a plurality of 9×9 input matrixes. Aiming at each input matrix, convolution computation is performed on the input matrix using a two-dimensional systolic array and a convolutional kernel of the convolutional layer, to obtain an output matrix corresponding to the input matrix.

The output matrix is also a 9×9 matrix.

In the present embodiment, these output matrixes are finally cached in a third cache unit after subsequent post-processing steps, and all the output matrixes of a convolutional layer cached in the third cache unit are written into a memory and combined in a memory as the output of the convolutional layer.

Optionally, the two-dimensional systolic array may perform parallel computation on a plurality of output channels of the convolutional layer.

S102, rearranging the output matrix, to obtain an output matrix after rearranging.

Generally, after convolution operation is performed on a 9×9 input matrix using a two-dimensional systolic array, the positions of data in the output matrix is generally not matched with the positions in the input matrix, therefore, the output matrixes need to be rearranged first to adjust the positions of the data in the output matrix.

For example, the form of an output matrix of a two-dimensional systolic array computed according to a 9×9 input matrix is as shown in Table 1 below:

TABLE 1

| y11 | y12 | y13 | y14 | y15 | y16 | y17 | y18 |
|-----|-----|-----|-----|-----|-----|-----|-----|
| y21 | y22 | y23 | y24 | y25 | y26 | y27 | y28 |
| y31 | y32 | y33 | y34 | y35 | y36 | y37 | y38 |
| y41 | y42 | y43 | y44 | y45 | y46 | y47 | y48 |
| y51 | y52 | y53 | y54 | y55 | y56 | y57 | y58 |
| y61 | y62 | y63 | y64 | y65 | y66 | y67 | y68 |
| y71 | y72 | y73 | y74 | y75 | y76 | y77 | y78 |
| y81 | y82 | y83 | y84 | y85 | y86 | y87 | y88 |
| y91 | y92 | y93 | y94 | y95 | y96 | y97 | y98 |

Wherein, three elements y21, y22 and y23 are respectively computed according to the elements in columns 3, 4, 5 of the first row of the input matrix, and three elements y31, y32 and y33 are respectively computed according to three elements in columns 6, 7, 8 of the first row of the input matrix, therefore, the correct positions of the above elements should be that the three elements y21, y22 and y23 are respectively located in columns 3, 4, 5 of the first row of the output matrix, and the three elements y31, y32 and y33 are respectively located in columns 6, 7, 8 of the first row of the output matrix. The other elements are similar.

In summary, when the output matrix is a matrix obtained after a convolution operation is performed on a two-dimensional systolic array, step S102 needs to be performed, so as to rearrange the output matrixes, and the ordered output matrixes obtained after rearranging the output matrixes shown in Table 1 above areas shown in Table 2 below:

TABLE 2

| y11 | y12 | y13 | y21 | y22 | y23 | y31 | y32 | y33 |
|-----|-----|-----|-----|-----|-----|-----|-----|-----|
| y14 | y15 | y16 | y24 | y25 | y26 | y34 | y35 | y36 |
| y17 | y18 | y19 | y27 | y28 | y29 | y37 | y38 | y39 |
| y41 | y42 | y43 | y51 | y52 | y53 | y61 | y62 | y63 |
| y44 | y45 | y46 | y54 | y55 | y56 | y64 | y65 | y66 |
| y47 | y48 | y49 | y57 | y58 | y59 | y67 | y68 | y69 |
| y71 | y72 | y73 | y81 | y82 | y83 | y91 | y92 | y93 |
| y74 | y75 | y76 | y84 | y85 | y86 | y94 | y95 | y96 |
| y77 | y78 | y79 | y87 | y88 | y89 | y97 | y98 | y99 |

S103, deleting rearranged redundant data of the output matrix, to obtain a filtered output matrix.

When the input of a convolutional layer is split into a plurality of 9×9 input matrixes, if the number of rows and columns of the input of the convolutional layer cannot be exactly divided by 9, the input of the convolutional layer needs to be expanded with expanded data (e.g., adding several columns of number 0 on the right side of the input of the convolutional layer and several rows of number 0 on the bottom), such that the number of rows and columns of the expanded input may be exactly divided by 9, and then the expanded input is divided to obtain a plurality of 9×9 input matrixes. In this condition, some input matrixes may carry the above expanded data, and these expanded data are also computed in the two-dimensional systolic array; the data computed from the expanded data in the output matrix corresponding to the input matrix carrying the expanded data is the redundant data of the output matrix.

Figure 2:
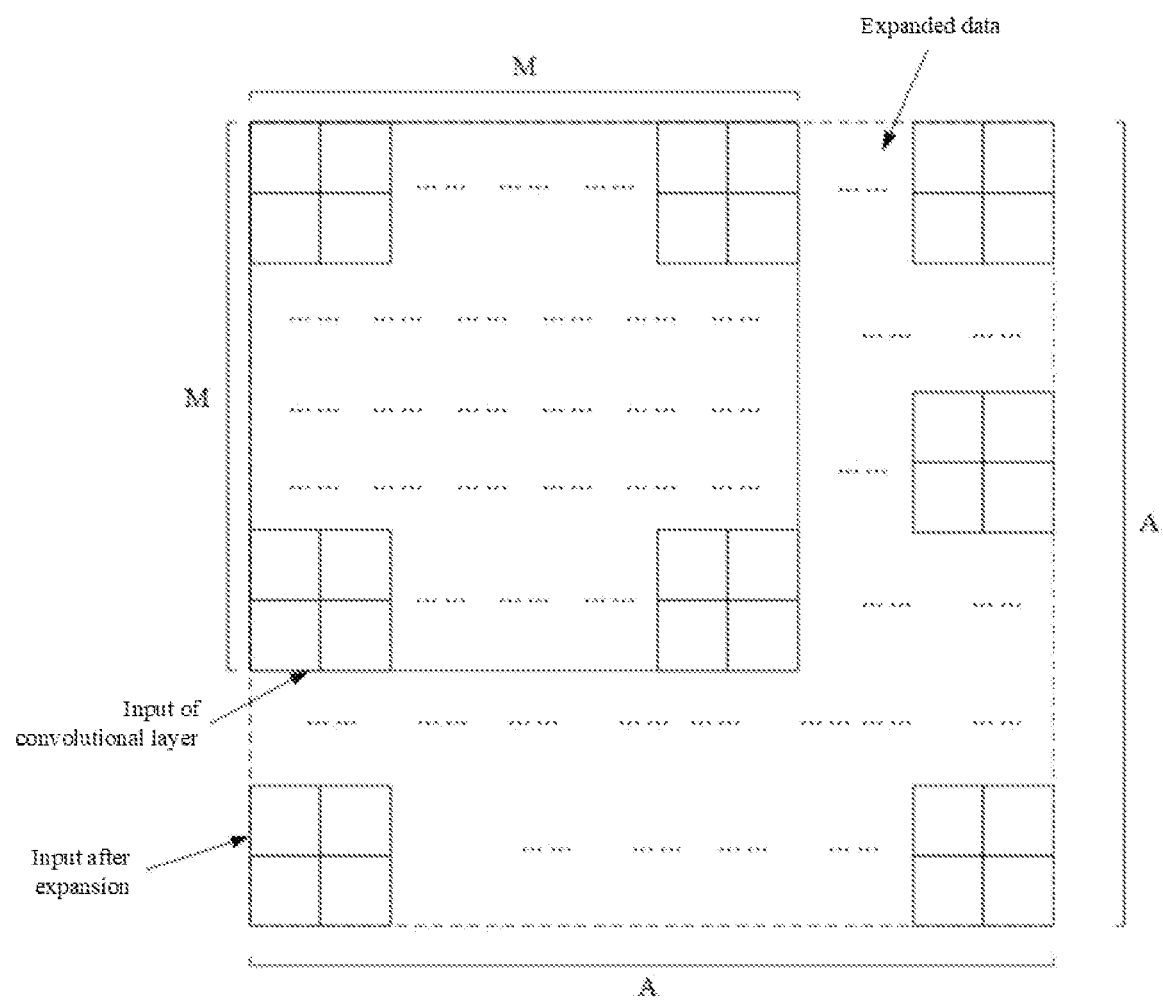
FIG. 2 is a schematic diagram of redundant data of an output matrix provided in an embodiment of the present invention.

Please refer to FIG. 2, a solid box is the input of a convolutional layer, with the number of rows and columns being both M, moreover, M is a positive integer which may not be exactly divided by 9. The input of the convolutional layer is expanded to obtain the expanded input shown in the figure, with the number of rows and columns being both A, and A is a positive integer which may be exactly divided by 9. The data between the solid box and the dashed box is just the expanded data.

It may be found that after dividing the expanded input, several input matrixes at the edges carry the above expanded data. After these input matrixes are computed to obtain corresponding output matrixes, the data in the output matrixes computed according to the above expanded data are the redundant data, and when a plurality of output matrixes are combined into the output of the convolutional layer, the redundant data in the output matrixes need to be deleted.

S104, respectively writing N rows of data of the filtered output matrix into N first-level cache queues of a target queue set of a first cache unit.

Wherein the first cache unit is preconfigured with two queue sets, the target queue set is the queue set that is not used to store a previous output matrix of the output matrix in the two queue sets; and the writing speed of the first cache unit matches with the computing speed of the processor.

The first cache unit is preconfigured with 2×N first-level cache queues, optionally, the cache queue may be a first input first output (FIFO) cache queue.

It should be noted that, the number of first-level cache queues in the first cache unit is determined according to the number of orders of the output matrix acquired in step S101, and is generally set to be twice the number of orders of the output matrix.

Further, the above 2×N first-level cache queues are equally divided into two queue sets, each queue set includes N first-level cache queues, and each first-level cache queue in the queue set respectively corresponds to each row of data in the output matrix.

Specifically, in the present embodiment, the first cache unit is divided into two queue sets (recorded as a first queue set and a second queue set, respectively), and the first queue set includes nine first-level cache queues, recorded as 1-1, 1-2, 1-3 . . . 1-9, respectively, and similarly, the nine first-level cache queues of the second queue set are recorded as 2-1, 2-2, 2-3 . . . 2-9, respectively. When the output matrix is written into the first cache unit, it is determined based on a ping-pong cache structure that one queue set of the two queue sets is determined as the target queue set. The nine rows of data of the output matrix may then be written into nine first-level cache queues of the target queue set according to the manner described in step S102.

The process of determining the target queue set is as follows:

As already indicated above, the present embodiment is introduced aiming at a particular output matrix in an output stream, therefore, it is understood that a state machine also writes a plurality of output matrixes into a first cache unit before performing step S104 on the current output matrix.

If the previous output matrix of the current output matrix is written into a first queue set, then for the current output matrix, the target queue set is the second queue set; if the previous output matrix of the current output matrix is written into the second queue set, then for the current output matrix, the target queue set is the first queue set, that is, for an output stream composed of a plurality of output matrixes, the plurality of output matrixes are alternately written into the first queue set and the second queue set in a sequence in which the two-dimensional systolic arrays are output.

S105, writing the data of the output matrix stored in the target queue set into the second cache unit line by line, so as to write the output matrix into the second cache unit.

It may be understood that, the data of the output matrix in the target queue set described in step S105 is the data of the filtered output matrix.

It should be noted that the writing the output matrix into the second cache unit as described in step S105 is performed after the previous output matrix of the current output matrix has been written into the second cache unit.

It may be understood that, if the current output matrix is recorded as matrix 1 and the previous output matrix of matrix 1 is recorded as matrix 2, then the step of writing matrix 2 into the second cache unit also needs to be performed after the previous output matrix of matrix 2 (recorded as matrix 3) is written into the second cache unit.

That is, if an output matrix is written into the first cache unit, and the first cache unit stores a plurality of output matrixes generated before the output matrix, then these output matrixes need to be written into the second cache unit one by one in a sequence in which the output matrixes are output.

The writing speed of the second cache unit matches with the computing speed of the processor.

In the first cache unit, the output matrix is divided into a plurality of rows and stored in corresponding first-level cache queues, respectively. Therefore, the process of performing step S105 may be reading a row of data of the output matrix from each first-level cache queue in the target queue set one by one.

For example, assuming that the target queue set is the first queue set, the process of performing step S105 is reading each row of data of the output matrix stored in these first-level caches from the first-level caches 1-1, 1-2, 1-3 . . . 1-9 one by one and writing into the second cache unit one by one, so as to combine output matrixes in the second cache unit.

The second cache unit may also be referred to as a second-level cache, and may be implemented with an FIFO.

S106, determining valid data in the output matrix of the second cache unit according to preset parameters, and writing the valid data of the output matrix into a third cache unit.

The output matrix in the present embodiment is the output matrix generated when the operation of the convolutional layer in the convolutional neural network is performed using the two-dimensional systolic array, therefore, the parameters in step S106 may be the step size of the convolutional layer.

If the present embodiment is applied to caching the output matrix generated in other computing processes, then the above parameters may be correspondingly adjusted.

The step size of the convolutional layer is a parameter in the convolution operation process. The step size is a positive integer greater than or equal to 1. If the step size of a convolutional layer is 1, then when the convolution operation of the convolutional layer is performed, convolution operation needs to be performed on each element in the input of the convolutional layer, to obtain the element in the output of the corresponding convolutional layer.

If the step size of the convolutional layer is 2, then the above computing process is to start from the elements of the first row and first column of the input of the convolutional layer, and compute every other element to obtain an element of the output of a convolutional layer.

Specifically, when the step size is 2, the element of the input of the convolutional layer is recorded as Xij and the element of the output of the convolutional layer is recorded as Yij, wherein, i represents that the row in which the element is located is the i-th row and j represents that the column in which the element is located is the j-th column, then Y11 is obtained through convolution operation on X11, Y12 is obtained through convolution operation on X13 (equivalent to Y12 corresponding to X13), and Y13 corresponds to X15, and so on, moreover, Y21 corresponds to X31, Y22 corresponds to X33, Y23 corresponds to X35, and so on. Equivalently, this corresponds to the fact that for the input of a convolutional layer, every other element is computed to obtain an element of the output of a convolutional layer.

When the step size is 3, computation is performed for the elements in the input every two convolutional layers, when the step size is 4, computation is performed for the elements in the input every three convolutional layers, and so on.

However, when the output matrix is computed using a two-dimensional systolic array, the step size of a convolutional layer is generally not considered in order to facilitate the design of the two-dimensional systolic array, that is, regardless of the step size of the convolutional layer, the output matrix is defaulted to 1 when the output matrix is computed through the two-dimensional systolic array, that is, each element of the input matrix is computed to obtain a corresponding element of the output matrix. Therefore, when the step size of the convolutional layer is greater than 1, the data at the corresponding position in the output matrix of the second cache unit is determined as valid data according to the step size, and only the valid data is written into the third cache unit.

For example, assuming that the step size is 2 and each element of the output matrix (recorded as Aij) is computed according to the element at the corresponding position of the input matrix (recorded as Bij), with i and j respectively representing the row coordinate and the column coordinate of the element, then according to the previous section, A11, A13, A15, A17 and A19; A31, A33, A35, A37 and A39; A51, A53, A55, A57 and A59; A71, A73, A75, A77 and A79; A91, A93, A95, A97 and A99 in the output matrix are the elements that need to be stored in the output of the convolutional layer, and these elements are the valid data of the output matrix. The elements in the output matrix other than the above elements do not need to be written into the output of the convolutional layer and can be deleted directly.

Of course, if the step size is 1, then all the data of the output matrix are all valid data.

After the valid data of the output matrix are written into a third cache unit, the matrix composed of these valid data may be considered as a valid output matrix.

Wherein, a plurality of valid output matrixes in the third cache unit are configured to be sequentially written into a memory according to a sequence in which the output matrixes are generated, and the writing speed of the third cache unit matches with the computing speed of the processor.

The third cache unit may also be referred to as a third-level cache, and may be implemented with an FIFO.

The valid data of the output matrix in the second cache unit is written into the third cache unit after the valid data of the previous output matrix of the current output matrix has been written into the third cache unit. The valid output matrix of the third cache unit is also written into a memory after the previous valid output matrix has been written into the memory.

Please refer to the comments in step S105, if a plurality of output matrixes are available in the second cache unit, these output matrixes should be written into a third cache unit one by one in a sequence in which these output matrixes are generated. The valid output matrixes in the third cache unit should also be written into a memory one by one in a sequence in which the valid output matrixes are generated.

The three-level cache is designed as an asynchronous cache. The write clock of the three-level cache belongs to the convolution computation and cache clock domain, and the read clock belongs to the write memory clock domain. The third-level cache and the memory are connected by an AXI bus, and data transfer between the third-level cache and the memory is realized by an AXI burst write length and an AXI bus status.

It may be understood that, the process for data caching introduced in the preceding section is an implementation process of a method for data caching provided in the present embodiment introduced with an output matrix generated by a two-dimensional systolic array as an example. In the actual operation process, the process of processing and caching an output matrix introduced in the preceding section may be directly applied to each output matrix generated by a two-dimensional systolic array, that is, an output stream of a two-dimensional systolic array.

Specifically, aiming at the output stream composed of a plurality of output matrixes generated one by one by a two-dimensional systolic array, the working process of the method for data caching provided in the present embodiment is as follows:

acquiring an output stream of a two-dimensional systolic array, writing the first output matrix into a first cache unit according to corresponding steps in the above section; then writing the first output matrix into a second cache unit, and simultaneously writing the first cache unit into a second output matrix; and then writing the first output matrix into a third cache unit, writing the second output matrix in the first cache unit into a second cache unit, and simultaneously writing a third input matrix into a first cache unit, and so on. Wherein, each output matrix of a two-dimensional systolic array will be processed through the process introduced in the above section according to a generation sequence and cached to a third cache unit, meanwhile, a plurality of output matrixes in the third cache unit are written into a memory one by one in a generation sequence, and finally, the output of the entire convolutional layer is written into a memory.

As to the method provided in an embodiment of the present application, the execution body may be considered to be one, a state machine achieved by utilizing a field programmable gate array (FPGA) may read and write data of each cache unit through performing the method provided in the present embodiment, so as to achieve caching of the output matrix.

The present invention provides a method for data caching, including: acquiring output matrixes one by one, writing alternately a plurality of acquired output matrixes into two queue sets of a first cache unit according to a sequence in which each output matrix is acquired, writing output matrixes stored line by line in a first cache unit into a second cache unit one by one, determining valid data of each output matrix of the second cache unit one by one according to preset parameters in a sequence in which the valid data are written into the second cache unit, and writing valid data of each output matrix into a third cache unit, wherein the valid data of the output matrix stored in the third cache unit are configured to be sequentially written into a memory according to a sequence in which the valid data are written into the third cache unit. In the present solution, output matrixes are cached utilizing a cache unit with the writing speed matching with the computing speed of a processor, and the output matrixes are completely written into a memory one by one according to a sequence of generation time. Therefore, the present invention may solve the problem that the computing speed of the processor does not match with the writing speed of the memory.

Figure 3:
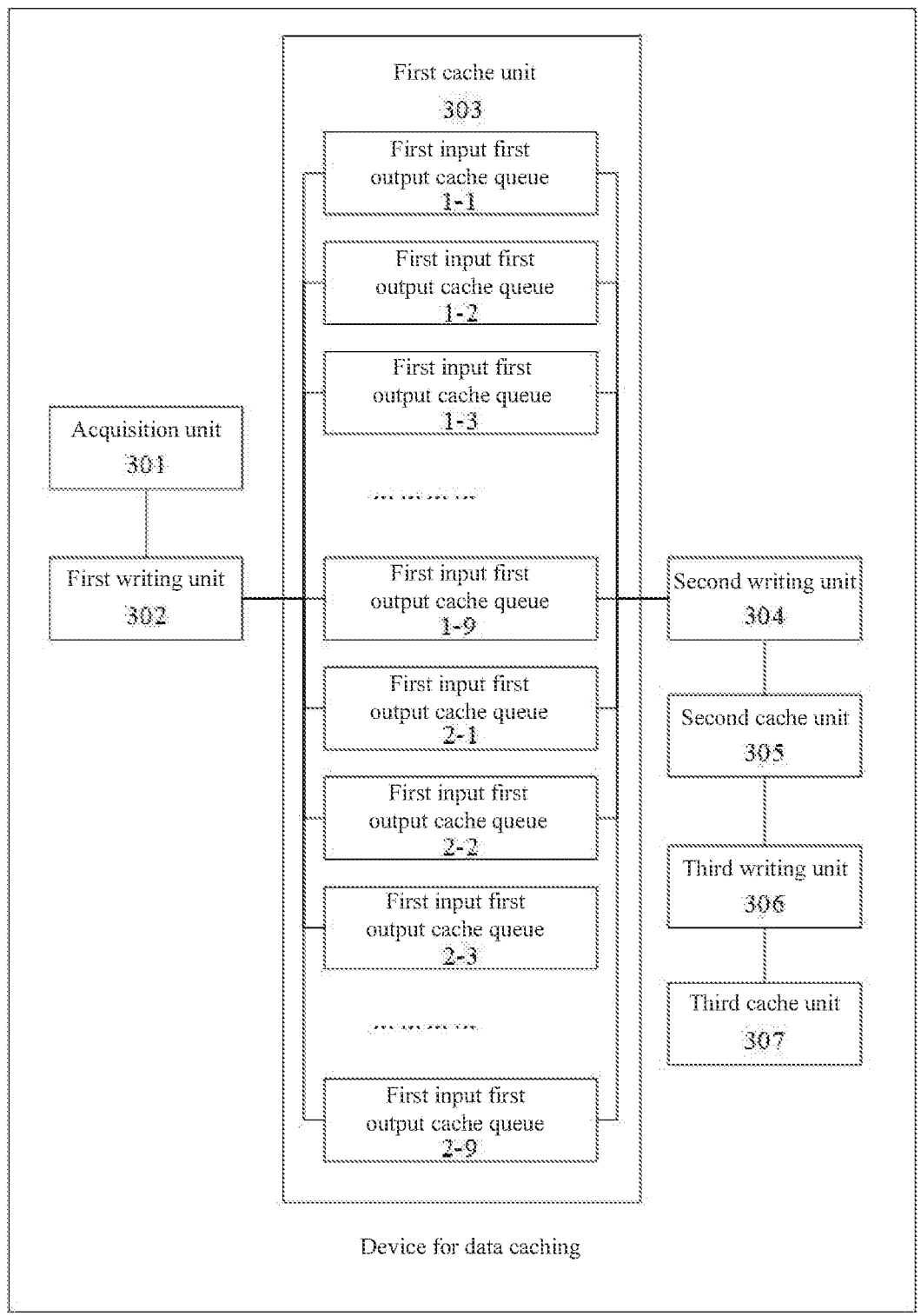
FIG. 3 is a structural schematic diagram of an apparatus for data caching provided in an embodiment of the present invention.

In combination with a method for data caching provided in an embodiment of the present application, another embodiment of the present application provides an apparatus for data caching, please refer to FIG. 3, the device includes:

an acquisition unit 301, configured to acquire an output matrix from a processor, wherein the output matrix is an N-order matrix, and N is a positive integer;

a first writing unit 302, configured to respectively write N rows of data of the output matrix into N first-level cache queues of a target queue set of a first cache unit;

wherein the first cache unit is preconfigured with two queue sets, the target queue set is the queue set that is not used to store a previous output matrix of the output matrix in the two queue sets; and the writing speed of the first cache unit matches with the computing speed of the processor;

a first cache unit 303, configured to cache data written into a first writing unit 302;

wherein, as shown in the figure, the first cache unit includes 18 first-level caches (FIFO), wherein 9 first-level caches numbered 1-1, -12, 1-3 . . . 1-9 constitute a first queue set, and 9 first-level caches numbered 2-1, 2-2, 2-3 . . . 2-9 constitute a second queue set;

a second writing unit 304, configured to write the data of the output matrix stored in the target queue set into the second cache unit line by line after the previous output matrix of the output matrix stored in the first cache unit is written into a second cache unit, so as to write the output matrix into the second cache unit; wherein the writing speed of the second cache unit matches with the computing speed of the processor;

a second cache unit 305, configured to cache data written by the second writing unit;

a third writing unit 306, configured to determine valid data in the output matrix according to preset parameters after the valid data of the previous output matrix of the output matrix stored in the second cache unit is written into a third cache unit, and write the valid data of the output matrix into the third cache unit; wherein the valid data of a plurality of output matrixes in the third cache unit is configured to be sequentially written into a memory in a sequence in which the output matrixes are acquired, and wherein, the writing speed of the third cache unit matches with the computing speed of the processor; and a third cache unit 307, configured to cache data written by the third writing unit 306.

Optionally, the output matrix is an output matrix obtained by convolution computation using a two-dimensional systolic array during the computing process of the convolutional neural network;

the first writing unit 302 is specifically configured to:
rearrange the data matrix according to a preset data storage sequence, to obtain an output matrix after rearranging;
respectively write N rows of data of an output matrix after rearranging into N first-level cache queues of a target queue set of a first cache unit.

Optionally, the first writing unit 302 is specifically configured to:
delete redundant data of the output matrix, to obtain a filtered output matrix;
write the filtered output matrix into a target queue set of a first cache unit, wherein M rows of data of the filtered output matrix are respectively stored in M cache queues of the target queue set, wherein M is a positive integer less than or equal to N.

Optionally, the output matrix is an output matrix obtained by convolution computation using a two-dimensional systolic array during the computing process of the convolutional neural network;

the third writing unit 306 is specifically configured to:
determine valid data in the output matrix according to a preset step size in the convolutional neural network.

As to an apparatus for data caching provided in an embodiment of the present application, for the working principles, please refer to the method for data caching provided in an embodiment of the present application, which will not be repeated redundantly herein.

Those skilled in the art may implement or use the present application. Various modifications to these embodiments will be apparent to those skilled in the art, and the general principles defined herein may be implemented in other embodiments without departing from the spirit or scope of the present application. Accordingly, the present application will not be limited to these embodiments shown herein, but will be subject to the widest scope consistent with the principles and novel features disclosed herein.

The invention claimed is:

1. A method for data caching, comprising:
acquiring an output matrix from a processor, wherein the output matrix is an N-order matrix, and N is a positive integer;
respectively writing N rows of data of the output matrix into N first-level cache queues of a target queue set of a first cache unit; wherein the first cache unit is preconfigured with two queue sets, the target queue set is the queue set that is not used to store a previous output matrix of the output matrix in the two queue sets; and the writing speed of the first cache unit matches with the computing speed of the processor;
after the previous output matrix of the output matrix stored in the first cache unit is written into a second cache unit, writing the data of the output matrix stored in the target queue set into the second cache unit line by line, so as to write the output matrix into the second cache unit; wherein the writing speed of the second cache unit matches with the computing speed of the processor; and
after valid data of the previous output matrix of the output matrix stored in the second cache unit is written into a third cache unit, determining valid data in the output matrix according to preset parameters, and writing the valid data of the output matrix into the third cache unit; wherein the valid data of a plurality of output matrixes in the third cache unit is configured to be sequentially written into a memory in a sequence in which the output matrixes are acquired, and wherein the writing speed of the third cache unit matches with the computing speed of the processor.

2. The method according to claim 1, wherein, the output matrix is an output matrix obtained by convolution computation using a two-dimensional systolic array during the computing process of a convolutional neural network;
   before respectively writing N rows of data of the output matrix into N first-level cache queues of a target queue set of a first cache unit, the method further comprises:
   rearranging the data matrix according to a preset data storage sequence, to obtain an output matrix after rearranging;
   respectively writing N rows of data of the output matrix into N first-level cache queues of a target queue set of a first cache unit comprises:
   respectively writing N rows of data of an output matrix after rearranging into N first-level cache queues of a target queue set of a first cache unit.

3. The method according to claim 1, wherein, the method further comprises the following step before respectively writing N rows of data of the output matrix into N first-level cache queues of a target queue set of a first cache unit:
   deleting redundant data of the output matrix, to obtain a filtered output matrix;
   respectively writing N rows of data of the output matrix into N first-level cache queues of a target queue set of a first cache unit comprises:
   writing the filtered output matrix into a target queue set of a first cache unit, wherein M rows of data of the filtered output matrix are respectively stored in M cache queues of the target queue set, wherein M is a positive integer less than or equal to N.

4. The method according to claim 1, wherein, the output matrix is an output matrix obtained by convolution computation using a two-dimensional systolic array during the computing process of the convolutional neural network;
   determining the valid data in the output matrix according to preset parameters comprises:
   determining valid data in the output matrix according to a preset step size in the neural network.

5. The method according to claim 2, wherein, the process of performing convolution computation by using a two-dimensional systolic array to obtain an output matrix comprises:
   splitting input data of a convolutional layer into a plurality of input matrixes; and
   performing convolution computation on the input matrix using a two-dimensional systolic array aiming at each input matrix, to obtain an output matrix corresponding to the input matrix.

6. The method according to claim 4, wherein, the process of performing convolution computation by using a two-dimensional systolic array to obtain an output matrix comprises:
   splitting input data of a convolutional layer into a plurality of input matrixes; and
   performing convolution computation on the input matrix using a two-dimensional systolic array aiming at each input matrix, to obtain an output matrix corresponding to the input matrix.

\* \* \* \* \*